US 11,708,073 B2

(12) United States Patent
Brown et al.

(10) Patent No.: US 11,708,073 B2
(45) Date of Patent: Jul. 25, 2023

(54) VEHICLE-TO-X COMMUNICATION AND HANDLING FOR VEHICLE COORDINATION AND MANAGEMENT

(71) Applicant: FORD GLOBAL TECHNOLOGIES, LLC, Dearborn, MI (US)

(72) Inventors: Andrew Brown, Farmington Hills, MI (US); Brendan F. Diamond, Grosse Pointe, MI (US); Joshua Sharpe, Farmington Hills, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 17/240,127

(22) Filed: Apr. 26, 2021

(65) Prior Publication Data

US 2022/0340173 A1 Oct. 27, 2022

(51) Int. Cl.
| | | |
|---|---|---|
| *B60W 30/095* | (2012.01) | |
| *B60W 60/00* | (2020.01) | |
| *H04W 4/021* | (2018.01) | |
| *G08G 1/052* | (2006.01) | |
| *G08G 1/056* | (2006.01) | |
| *B60W 10/18* | (2012.01) | |
| *B60W 50/14* | (2020.01) | |
| *G08G 1/00* | (2006.01) | |

(52) U.S. Cl.
CPC ........ *B60W 30/0956* (2013.01); *B60W 10/18* (2013.01); *B60W 50/14* (2013.01); *B60W 60/0027* (2020.02); *B60W 60/00274* (2020.02); *G08G 1/052* (2013.01); *G08G 1/056* (2013.01); *G08G 1/207* (2013.01); *H04W 4/021* (2013.01); *B60W 2520/06* (2013.01); *B60W 2520/10* (2013.01); *B60W 2556/50* (2020.02)

(58) Field of Classification Search
CPC .. B60W 30/0956; B60W 10/18; B60W 50/14; B60W 60/0027; B60W 60/00274; B60W 2520/06; B60W 2520/10; B60W 2556/50; G08G 1/052; G08G 1/056; G08G 1/207; H04W 4/021
See application file for complete search history.

(56) References Cited

U.S. PATENT DOCUMENTS

| | | | |
|---|---|---|---|
| 9,305,462 B2 | 4/2016 | Rubin et al. | |
| 10,379,197 B2 * | 8/2019 | Serebrennikov | ........ G01S 19/19 |
| 10,410,516 B1 * | 9/2019 | Andersson | ........... G08G 1/0112 |
| 11,124,204 B1 * | 9/2021 | Narang | ................ G05B 13/027 |

(Continued)

FOREIGN PATENT DOCUMENTS

CN 108648555 A 10/2018

*Primary Examiner* — Dale W Hilgendorf
(74) *Attorney, Agent, or Firm* — Joseph Zane; Brooks Kushman P.C.

(57) ABSTRACT

A system receives confirmation that a vehicle has accepted automatic control imposition for a drive within a geo-fenced boundary. The system tracks travel of a plurality of vehicles, including the vehicle, within the geo-fenced boundary. The system may determine that the vehicle has a threshold likelihood of encountering at least one of another vehicle or a boundary of the geo-fence at a threshold speed or above and responsive to the determination, impose automatic control on the vehicle, including at least one of controlled braking or speed limiting.

8 Claims, 4 Drawing Sheets

(56) References Cited

U.S. PATENT DOCUMENTS

| | | | |
|---|---|---|---|
| 11,420,617 B2* | 8/2022 | Gaither | B60W 40/02 |
| 2010/0094500 A1* | 4/2010 | Jin | G01C 21/26 |
| | | | 701/1 |
| 2017/0101110 A1* | 4/2017 | Yoo | B60W 50/08 |
| 2017/0110012 A1 | 4/2017 | Lewis et al. | |
| 2017/0210323 A1* | 7/2017 | Cordova | G08G 1/0129 |
| 2020/0211358 A1* | 7/2020 | Burke | G08B 21/043 |
| 2020/0262307 A1* | 8/2020 | Rosene | B60L 53/68 |
| 2021/0004611 A1* | 1/2021 | Garimella | G06T 11/00 |
| 2021/0018931 A1* | 1/2021 | Knutson | G01C 21/3461 |
| 2021/0331662 A1* | 10/2021 | Gaither | B60W 40/02 |

* cited by examiner

VEHICLE-TO-X COMMUNICATION AND HANDLING FOR VEHICLE COORDINATION AND MANAGEMENT

TECHNICAL FIELD

The illustrative embodiments generally relate to vehicle-to-x (V2X, which can include, vehicle to vehicle V2V, vehicle to infrastructure V2I, vehicle to cloud V2C, etc., collectively V2X) communication and handling for vehicle coordination and management.

BACKGROUND

Off-road driving is becoming increasingly popular as vehicles are equipped with advanced handling features. Many states have established off-road vehicle (ORV) parks that allow drivers to travel in offroad conditions, often on loosely defined courses. In these and other situations where actual roads have not been paved, there is frequently a lack of traditional traffic control features that serve to manage traffic. Moreover, due to terrain changes and trail-overlap, it can be difficult to see and understand the locations of other vehicles using the same ORV course.

Optical guides (e.g., mirrors) and signs can serve some benefit in allowing drivers to control driving and keep a sense of where others are located, but between mud on windshields, flying dirt and uneven terrain, these traditional features may be less than completely useful. Also, in situations where trails/courses change or are not even laid out in the first place (e.g., a "sandbox" for ORV activity), it can be difficult to know where to deploy such permanent features, and they may often themselves represent a hazard when deployed.

SUMMARY

In a first illustrative embodiment, a system includes at least one processor enabled to receive confirmation that a vehicle has accepted automatic control imposition for a drive within a geo-fenced boundary. The processor is enabled to track travel of a plurality of vehicles, including the vehicle, within the geo-fenced boundary. The processor is also enabled to determine that the vehicle has a threshold likelihood of encountering at least one of another vehicle or a boundary of the geo-fence at a threshold speed or above and responsive to the determination, impose automatic control on the vehicle, including at least one of controlled braking or speed limiting.

In a second illustrative embodiment, a method, performed by at least one server processor, includes receiving confirmation that a vehicle has accepted automatic control imposition for a drive within a geo-fenced boundary. The method also includes tracking travel of a plurality of vehicles, including the vehicle, within the geo-fenced boundary. Further, the method includes determining that the vehicle has a threshold likelihood of encountering at least one of another vehicle or a boundary of the geo-fence at a threshold speed or above and responsive to the determination, imposing automatic control on the vehicle, including at least one of controlled braking or speed limiting.

In a third illustrative embodiment, a system includes at least one processor enabled to determine that a vehicle is approaching a geo-fenced boundary based on wireless communication received from the vehicle by the processor. The processor is also enabled to determine whether the vehicle has a digital permit to travel within the geo-fenced boundary, based on the communication. Further, responsive to determining that the vehicle has the digital permit, the processor is enabled to begin tracking progress of the vehicle once the vehicle passes within the geo-fenced boundary, the tracking based the wireless communication, and responsive to determining that the vehicle is approaching a boundary leading to an area designated as untravellable, impose automatic control over the vehicle to limit travel to the area.

DETAILED DESCRIPTION

Figure 1:
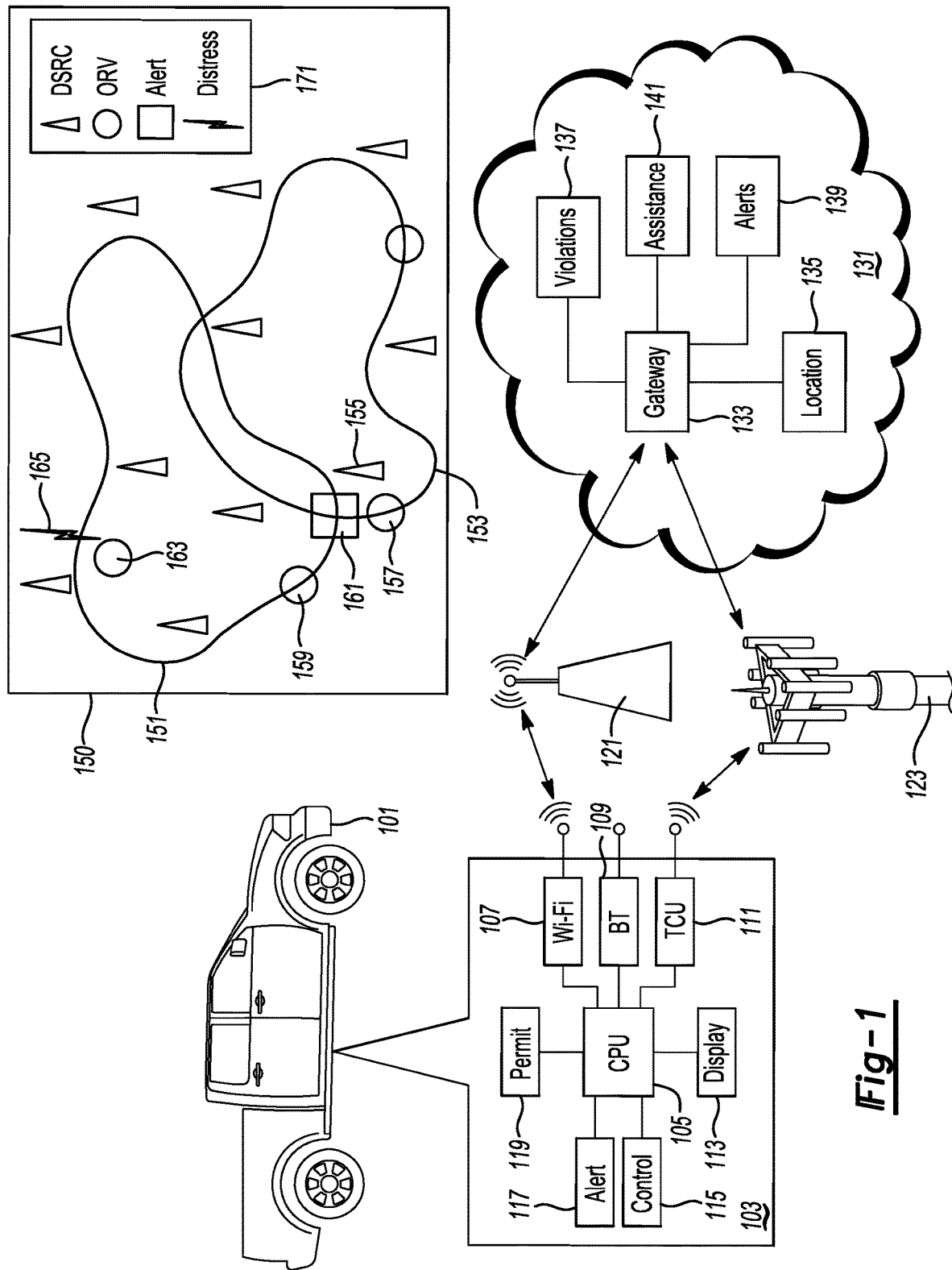
FIG. 1 shows an illustrative example of an ORV and vehicle communication system, as well as a virtual map of an ORV recreational area.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With the increasing popularity of ORV usage and course-provision, drivers will benefit from some focus on methods and apparatuses that decrease the likelihood of incident and allow drivers to better understand the actions and locations of other vehicles around them. While the illustrative embodiments are described with respect to ORVs, the concepts, methods and apparatuses can be extended to many situations where it is desirable to avoid or decrease a likelihood of unfavorable incident.

Many ORV courses are also provided inside state parks, and while using the designated areas for ORV travel is acceptable, ORVs traveling off-course can damage the ecosystem and present a problem for other humans seeking to enjoy the parks. Improper speeds, misuse of equipment, inexperience, lack of familiarity with a course and ignorance of other vehicles are all examples of situations that can lead to unfavorable results. Many of these aspects of driving are difficult, if not impossible, for park or course personnel to monitor and track, and some of these may lead to incident before remediation measures can be taken—e.g., a driver speeding above a limit and driving in an unpermitted zone may cause an incident before anyone can arrive on scene to stop the driver, and in many instances, the driver may not even be aware of one or both violations.

The illustrative embodiments leverage vehicle connectivity to provide improved safety systems that can warn drivers, diminish incident occurrence, alert personnel to violations and even, if desired, control a vehicle to prevent one or more actions that may lead to incident.

Aspects related to course creation allow staff or even individual drivers to lay out defined preferred courses without having to actually grade and pave the courses, and allow for dynamic course manipulation and modification for enjoyment or incident-related reasons (e.g., a point on a prior-defined course appears to bank too sharply, personnel can easily adapt the course to route around the point instead of through it). Aspects related to vehicle alert and control can apprise drivers of other vehicle locations, dangerous crossings, possible incidents, and violations of control or location aspects of driving. Adaptable vehicle capabilities (e.g., traction control, drive-usage, etc.) can be dynamically and automatically adjusted to terrain expectations and difficulty. Park and trail rules can even be dynamically adapted to the instant situation, such as increasing speed limits and off-course permissibility when only one vehicle is present.

Illustratively, V2I communication, which can include communication with infrastructure units such as dedicated short-range communication (DSRC) transceivers deployed throughout a course, can keep vehicles in communication with each other, personnel and the cloud. V2V communication can keep vehicles in communication with each other and allow for fast adaptation to the presence of another vehicle, even if a driver cannot see the other vehicle. V2C communication can keep drivers aware of changing conditions (e.g., weather, limits, other vehicles), provide contact with authorities or assistance when needed, and generally be used for adaptation of vehicle systems to react to known and changing course conditions.

DSRC units deployed throughout a course can provide general boundaries for the course, through both their existence and using them to define a virtual fence, if desired, and can further be used to track all vehicles on the course that have DSRC communication capability. Vehicle location knowledge can help avoid multi-vehicle incidents and notify drivers of congested track regions, as well as provide for traffic management and instructions to drivers when park traffic needs to have traffic control implemented.

FIG. 1 shows an illustrative example of an ORV and vehicle communication system, as well as a virtual map of an ORV recreational area. In this example, one or more vehicles 101 include onboard communication and computing systems 103. These can include, but are not limited to, one or more processors 105 and a plurality of onboard communication controllers and transceivers. Exemplary communication systems include, but are not limited to, Wi-Fi transceivers 107, which can communicate with DSRC transceivers 121 if properly enabled, BLUETOOTH transceivers 109, which can communicate with in-vehicle devices and other vehicles and infrastructure elements, telematics control units (TCUs) 111, which can communicate with cellular networks 123, and other such devices usable for V2X communication.

The vehicle systems 103 may also include a plurality of hardware, software or firmware devices that provide for various aspects of in-vehicle information provision and systems control. This can include, for example, without limitation, a display 113, vehicle control logic 115 (achievable through use of software, firmware and electronic control units (ECUs), for example), and alert handling process 117. In illustration only, these are examples of some of the onboard devices and logical systems that allow for implementation of aspects of the illustrative embodiments and the like.

Additionally, at an on-site server or elsewhere in the cloud 131 (or both, in many instances), there may be one or more gateway processes 133, location tracking and provision processes 135, alert handling processes 139, violation defining and handling processes 137, and driver-assistance processes 141. Various aspects of processes described herein, and the like, may occur onboard, on-site or in the cloud as is appropriate and based on equipment provided to the vehicles and on-site systems. For example, a highly advanced ORV may be able to handle a great deal of onboard process control, whereas an older ORV may have an after-market unit with a display installed that provides basic location tracking and alert-provision capability.

Display 150 is an example of a display that may be shown in both a vehicle and a central monitoring system, or either alone. Data included in this display may be provided to drivers in audible or haptic forms, whether or not the display is also available in the vehicle 101. The key 171 shows a variety of exemplary pieces of data that may be shown on the displayed track maps 150, such as DSRC locations, ORV present or known locations, alert situations and distress signals, as well as any other appropriate information.

In this example, the display, which may be viewed by a vehicle 101 operator using display 113, for example, or may be viewed by on-site or off-site personnel or authorities, includes two tracks defined as 151 and 153. These tracks may have defined boundaries or may have been defined using a mapping creation process such as that shown in illustrative FIG. 6, whereby a series of GPS coordinates loosely defines the general route for a track. The tracks may be marked physically or virtually (using digital infrastructure and coordinates) and may further include a number of DSRC transceivers 155, the locations of which are shown on the display. The display of DSRC locations may be useful as guidelines to a track and/or provide location points to which a distressed vehicle 101 may attempt to reach or become proximate too, in order to ensure signal transmission. While it would be useful to have overlapping DSRC coverage covering the entire locations of both tracks 151, 153, due to outages, signal loss, and unavailability of mounts, for example, it may not always be possible to achieve this. Active vs. inactive DSRC may also be indicated by the display, using colors or other suitable designators.

The track display 150 also shows the known, last known or projected (e.g., dead-reckoned) location of each vehicle 157, 159. The tracks themselves may have a directionality aspect, and/or indicators, such as arrows, may provide for vehicle headings. In this example, both vehicles 157, 159 are approaching an intersection of their respective tracks, and thus an alert 161 is shown to indicate a need for caution by both drivers. If either vehicle 157, 159 passed the intersection, the alert could be removed if there was no projected threat of incident (e.g., if the vehicle did not suddenly do an about-face or the other vehicle was not attempting to turn onto the other track where the first vehicle has just crossed).

This display also includes a stranded vehicle 163, which is off-track and which is further sending out a distress signal, indicated by 165. The off-track location and/or signal can be an indicator to other drivers to drive with caution, as well as allow other drivers to potentially assist. Park and/or safety personnel may also respond to the signal with assistance.

In some embodiments, if desired, more information can be obtained about any object on the map through interaction (or already be displayed). For example, selection of vehicle 157 can bring up a display about the type of vehicle, capabilities, known or projected experience of driver, experience with the current track or park, etc. Selection of vehicle 163 could bring up the nature of the distress call (e.g., vehicle stuck vs. person injured), so drivers can determine if they can assist or should leave assistance up to a professional. Selection of the intersection may bring up a recommended speed or control strategy, which may also be shown in conjunction with the alert when generated and/or displayed, so that an active driver can quickly obtain the relevant information. Selection of a DSRC transceiver 155 may show the location of the transceiver in coordinates.

Selection of another vehicle may also allow for communication directly with the vehicle 163, via V2V or V2I communication, for example. Actual communication credentials could be stored in the cloud 131 and rendered accessible through driver permissions, in response to distress, as a requirement for using the park, etc. This can serve to maintain protection of the credentials while also allowing for V2V communication so that drivers can coordinate and assist each other. An encrypted version of a driver cellular phone number could also be provided to the TCU 111, so the vehicle 159 could call the other vehicle 163 directly over the cellular network, if desired, without revealing the actual phone number to the driver. In instances where the distress relates to an injury, for example, an unencrypted version of the number may be broadcast to all vehicles 157, 159 to maximize opportunities to call the driver and assist (e.g., if both vehicles 157, 159 lacked TCUs, those drivers could still use personal cellular phones to contact the number and offer assistance or offer to help obtain assistance). Permission to send such information may be at driver discretion, but local safety regulations may also require that certain information be shared in order to use a track, or in an instance of true emergency. In those cases, entry to the track could apply the relevant local settings automatically, with a notification to the driver about what was being shared and/or an option to leave the track if the driver does not want to share the information.

Figure 2:
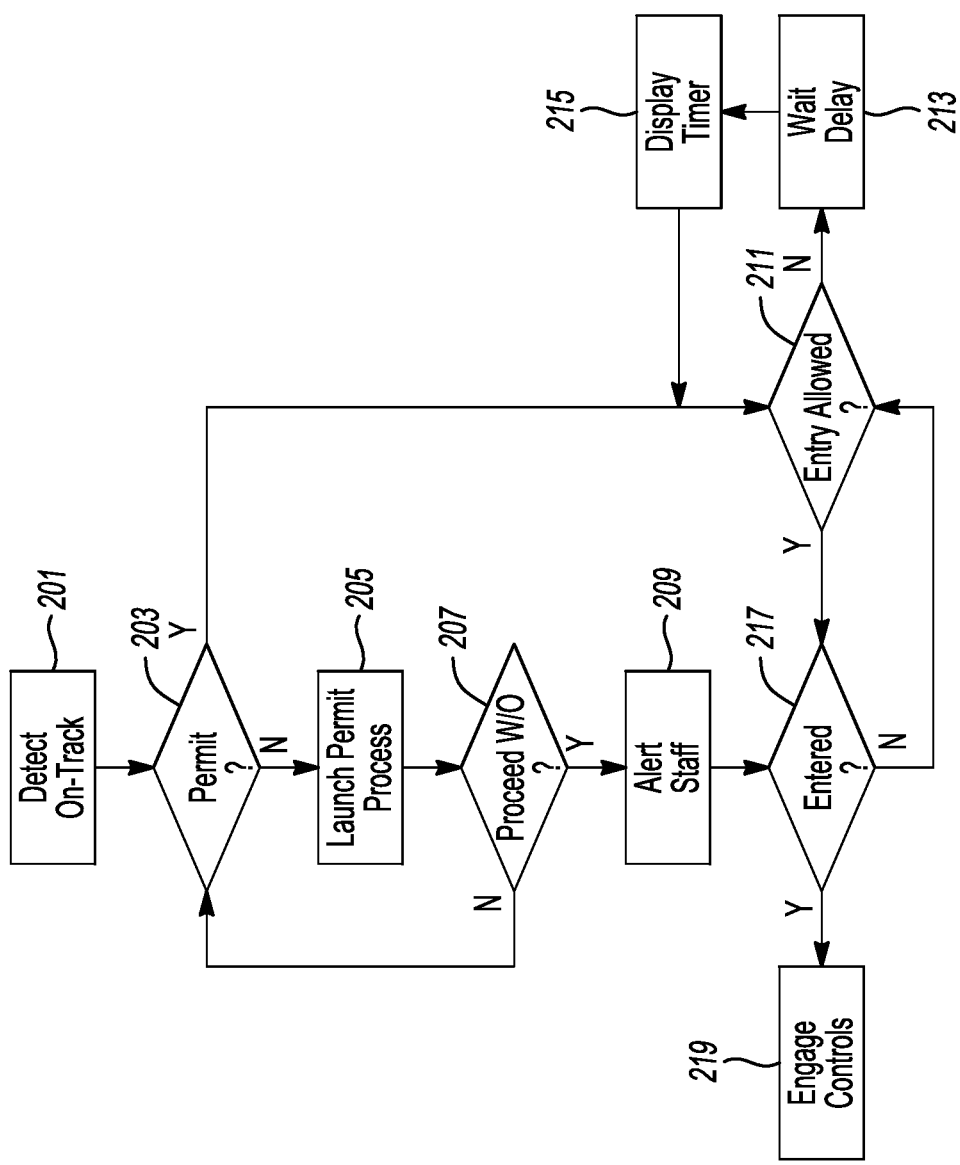
FIG. 2 shows an illustrative process for track-entry and permitting control.

FIG. 2 shows an illustrative process for track-entry and permitting control. In this example, the vehicle 101 utilizes a digital permit 119 for track use, to minimize the need for on-site personnel and to ensure compliance with regulations and permitting requirements.

In this example, the process determines if the vehicle 101 is onsite at the track 150 at 201. This can be detected via GPS coordinates, reaching a route destination, via beacon or DSRC communication at the track, etc. Once the vehicle 101 is on-site, the process determines if the vehicle 101 has a digital permit associated therewith at 203. This could be a permit stored in the vehicle memory, or stored in the cloud with respect to a vehicle account, stored on-site at the track and associated with a vehicle or user, etc.

If the vehicle 101 lacks a permit at 203, the process launches or engages a permitting process at 205. This can include launching an application or interfacing with an existing process to register the user and collect any vehicle and payment information. Permitting may include identification of VIN and aftermarket add-ons, as well as option package add-ons, so that for scaled permits that permit different access with different feature packages, the correct permit can be correlated to the vehicle. It may also include access to a user profile defining experience with these sorts of parks and tracks.

If the user simply drives onto the track without a permit at 207, which may be possible where tracks are not gated and lack on-site personnel, then the process can alert staff or authorities as appropriate, at 209. Because of public welfare constraints, not to mention maintenance costs, it may be desirable to require permitting of all vehicles for reasons related to at least ensuring that proper vehicles are being drive on the track. In instances where automatic vehicle control is possible, it may also be possible to simply prevent the vehicle from progressing onto the track, or overly limiting performance in a way that makes unpermitted driving undesirable.

If the permit is found or obtained at 203, the process may then determine if entry is presently allowed at 211. Control of the volume of vehicles on the track may be important, and drivers may be given time windows for usage to maintain a lower total usage while still giving plenty of access. If entry is not allowed, there may be a delay at 213 associated with a projected entry time that is displayed at 215. The vehicle 101 may be asked or forced to wait for at least the delay period and then allowed to enter, or entry may be contingent on another vehicle leaving. Again, if control of the vehicle is enforced, then the vehicle can be physically prevented from entering the track via onboard controls that prevent forward movement onto the track (or severely limit forward movement past a point). Once the vehicle 101 has entered the track at 217, any onboard control functions are engaged at 219. This is described in greater detail later herein, but can include, for example, speed limit controls, automatic system settings, geo-fenced travel limits, etc. Whether or not these controls are imposed may be park by park and based on user preference, park rules, local regulations, etc.

Also, mere purchase and enablement of the permit may assign the ability to automatically control a vehicle. That is, the vehicle may store the permit and when a user approaches a park, the vehicle may display the permit and give the user a notification that entering the park will enable automatic control based on the existence of the permit. This ensures that control permission is given, and allows the user a chance to opt-out by not entering the park. This will not prevent an unpermitted vehicle from entering the park, but steep fines and quick alerts to track personnel could address that aspect.

Figure 3:
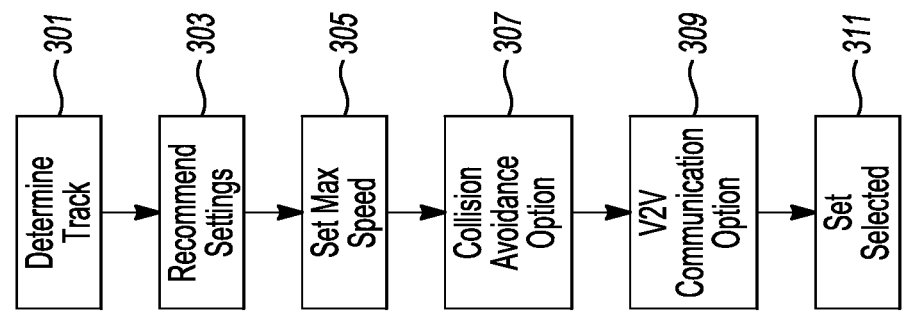
FIG. 3 shows an illustrative process for settings initiation.

FIG. 3 shows an illustrative process for settings initiation. This is an example of how settings are imposed and/or correlated to a given track. The track may have a preferred set of settings for various vehicle options, and/or an OEM database may provide recommended settings by comparing track conditions to known setting preferences and recommendations for a given condition. A user could also store custom settings for each track, to be imposed (when permitted) when the vehicle is on a given track or under given conditions. A track database or on-site computer, connected to the vehicle through DSRC, for example, may also have statistical information about areas of the track such as banks, width, roughness, etc. that may be useful in determining which settings to automatically apply or recommend.

In this example, the process determines which track the vehicle 101 is on at 301. This can include known tracks or tracks having certain conditions identified by the user or the track. Since not all tracks may be labeled, a database of ad-hoc tracks may also exist, where users can draw on information measured by the same vehicle or other vehicles running the track previously to determine the track conditions, as well as weather and other databases to determine environmental conditions that may aid in setting selection.

In this example, the process uses the track information as obtained to recommend a set of settings at 303. This can include various drive-mode settings, tire pressure settings, speed constraints, weight distribution settings, etc. For example, a track with turns that bank high right may inform the vehicle driver not to have too much weight on the downside of the vehicle (left side) or may recommend other weight distribution based on the fixed components of the vehicle. Some settings may be automatically adjustable, others may require a driver to manually adjust a setting. To the extent that a vehicle 101 can give feedback through a mobile device, the vehicle 101 can walk the driver through certain setting changes and tell the driver when measurable settings like tire pressure and weight placement are close to recommended.

In this example, the process also sets a maximum speed at 305, above which travel may be prevented or warned against (if the speed is approached). This can help avoid off-track incidents, roll-overs, and high-speed multi-vehicle incidents. Certain tracks may mandate these caps, others may simply require that the driver be notified (if a limit exists at all).

The system may also include an incident avoidance option at 307, which can be engaged to automatically slow a vehicle 101 if it is approaching a potential intersection with another vehicle 101. While this may take some control away from a driver, it may also help in conditions where there are blind turns and blind crossings, or heavy weather, and where human implemented braking may be insufficient or at least not the preferred option. Certain parks and tracks may require some level of automatic control opt-in when the driver enters, so that high-speed incidents can be avoided. In some instances, the automatic controls may only be engaged if the track reaches a certain occupancy, and in some instances the automatic controls may be engaged with respect to boundaries of the track, especially certain areas where boundaries lead to protected areas or dangerous areas. Drivers may voluntarily relinquish some control, which will often times simply be speed limiting and/or controlled braking projected to avoid undesirable consequences.

The driver also has the option to engage V2V communications at 309, which can allow inter-vehicle communication using Wi-Fi, BLUETOOTH, cellular etc. The driver can also configure what information is shared when, such as only sharing a cellular number directly with others if there is an indicated or detected injury, vs. sharing an ability to contact (through an encrypted credential) at other times. The process then applies all the selected settings at 311, and those settings can persist while the vehicle 101 is on the track, reverting when the vehicle 101 leaves the track. The settings can also be dynamically changed if conditions change or the vehicle 101 moves to a new track within a park, or upon user request to retune or change certain settings.

Figure 4:
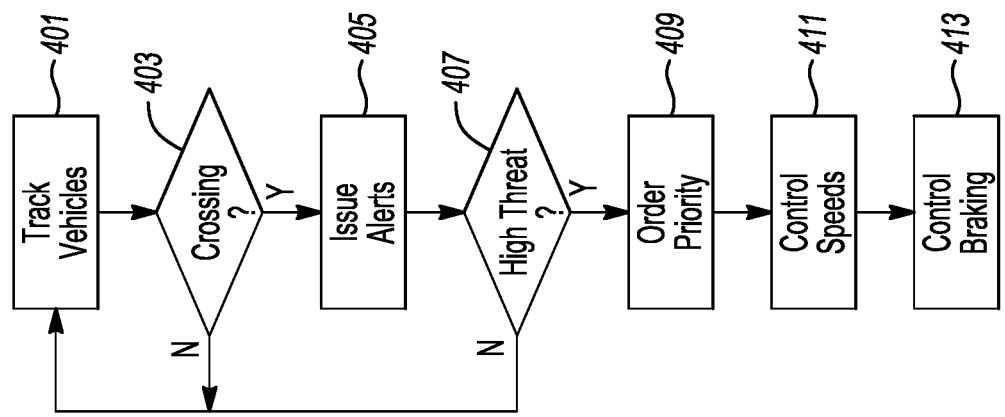
FIG. 4 shows an illustrative process for vehicle alert provision and alert handling.

FIG. 4 shows an illustrative process for vehicle alert provision and alert handling. In this example, the process will attempt to mitigate undesirable circumstances by keeping drivers apprised of the locations of other drivers and providing alerts or other mitigation as appropriate. The process can be a central process in the cloud, on-site, or at another location, and/or can also run on individual vehicles to the extent those vehicles 101 have the capability and rights to take certain actions.

Here, the process tracks the location of each vehicle 101 on the track at 401. Vehicle locations can be reported through any reasonable connection, and in this example the vehicles 101 report their locations to the DSRC transceivers when possible. Location can be a function of GPS coordinates, and received signal strength indicators (RSSI) and other factors can serve to diminish the margin of error with GPS, by confirming the location of the vehicle relative to an infrastructure unit of fixed position.

If a vehicle 101 is approaching an intersection with or the rear-portion of another vehicle at a high speed or under other undesirable conditions at 403, the process can issue alerts to the drivers of any affected vehicles at 405. These alerts may also be issued any time that trails cross or approaching blind turns, even if another vehicle 101 is not detected, in case the other vehicle lacks communication or has lost communication.

In certain high-threat instances at 407, in this example, mandatory overrides may be engaged if permitted by drivers and/or if required by law. For example, two vehicles approaching a crossing above certain speeds may be required to submit to mandatory ordering and override of speeds and progression.

In this example, the process orders a priority for crossing at 409, which can including giving preference to one vehicle over another for a variety of reasons, including, but not limited to, current speeds, current locations, track shape/ conditions at intersection, risks of slowing, etc. Once the priority is ordered, the process will control the vehicles 101 to enforce control in accordance with the priority. Even if override is not permitted or required, all of this information can also be conveyed in the form of recommendations or alerts to a driver as well.

The process also controls vehicle speeds in this example at 411, which can include both slowing vehicles and maintaining vehicle speeds, or even accelerating vehicles, if permitted and/or regulated, to move the vehicles through the intersection with decreased risk of incident. In a similar manner, braking may be controlled at 413. Certain functions may not be legally controllable, or may require driver override options, so those constraints may also be accommodated by the process—e.g., while the process can brake the vehicle, it cannot accelerate the vehicle, even if the brakes have been manually applied, so if that was a law or rule then the process may have to control other vehicles differently if a driver brakes when the driver was not supposed to.

Figure 5:
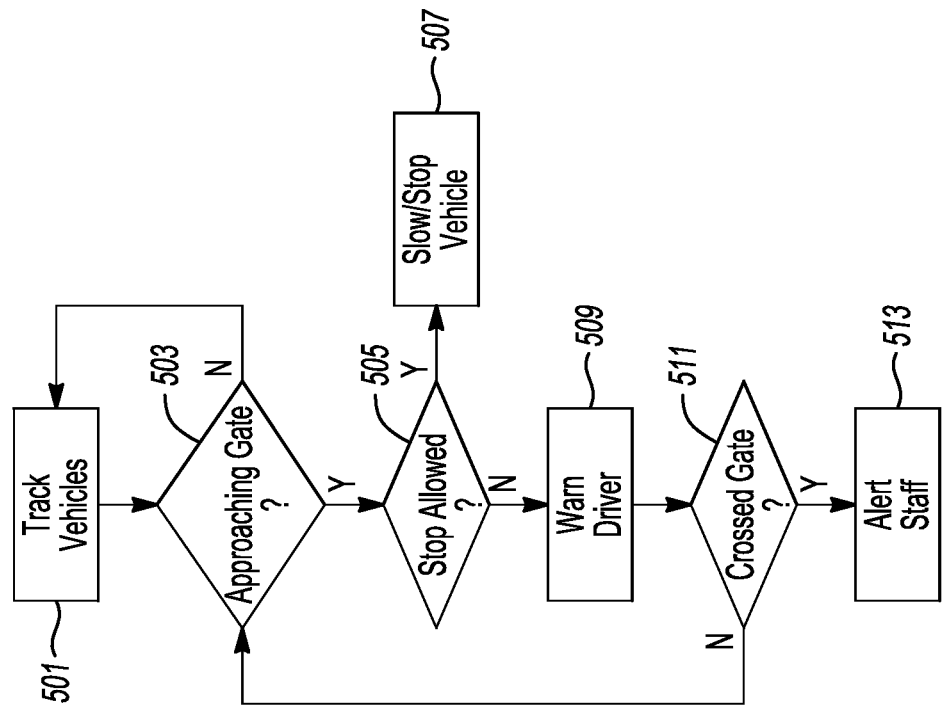
FIG. 5 shows an illustrative process for off-track alert and control.

FIG. 5 shows an illustrative process for off-track alert and control. In this example, the process can maintain virtual protection against intrusion into non-track areas where ecosystem preservation is paramount. Laws and rules about vehicle control may dictate which options are available to a given track, and what actions a track takes in response to an off-track state may also change based on the fragility of a given ecosystem and/or the likelihood of human presence. For example, the track may automatically brake a vehicle headed towards known animal habitats, but may simply warn a driver who is steering onto an open desert with little or no known wildlife or humans.

Again, the process tracks vehicle locations at 501, through processes previously described and the like. If the vehicle is approaching a virtual gate at 503 (which can be a defined track egress or any off-track location leading into a restricted area, determinable by a geo-fence or other virtual boundary crossing), the process determines if it is permitted to simply stop the vehicle at 505. This could include braking the vehicle and could go as far as killing the engine, depending on a perceived risk and how far the vehicle attempts to travel off-track.

If the stop is allowed, the process may first slow the vehicle and warn the driver, and eventually stop the vehicle, and may eventually even kill the engine at 507, if the driver continues to attempt to ignore the warnings and slow-downs. If a stop is not allowed at 505, because of laws/regulations and or driver permissions, the process may continue to warn the driver at 509 as the driver approaches the boundary (which may be past the edge of a recommended track, around the outside of a park portion including the tracks, for example, or there may be intra-park boundaries that restrict travel within certain regions of the park portion where the tracks are located—e.g., around a pond). If the driver attempts to or has crossed the "gate" (which, again, could be any portion of a defined virtual or real boundary), the process may alert staff at 513 and/or authorities as appropriate. Off-track driving may also be indicative of a vehicle malfunction, and not just driver intent, and so any relevant assistance requests may also be processed and distributed as appropriate.

Figure 6:
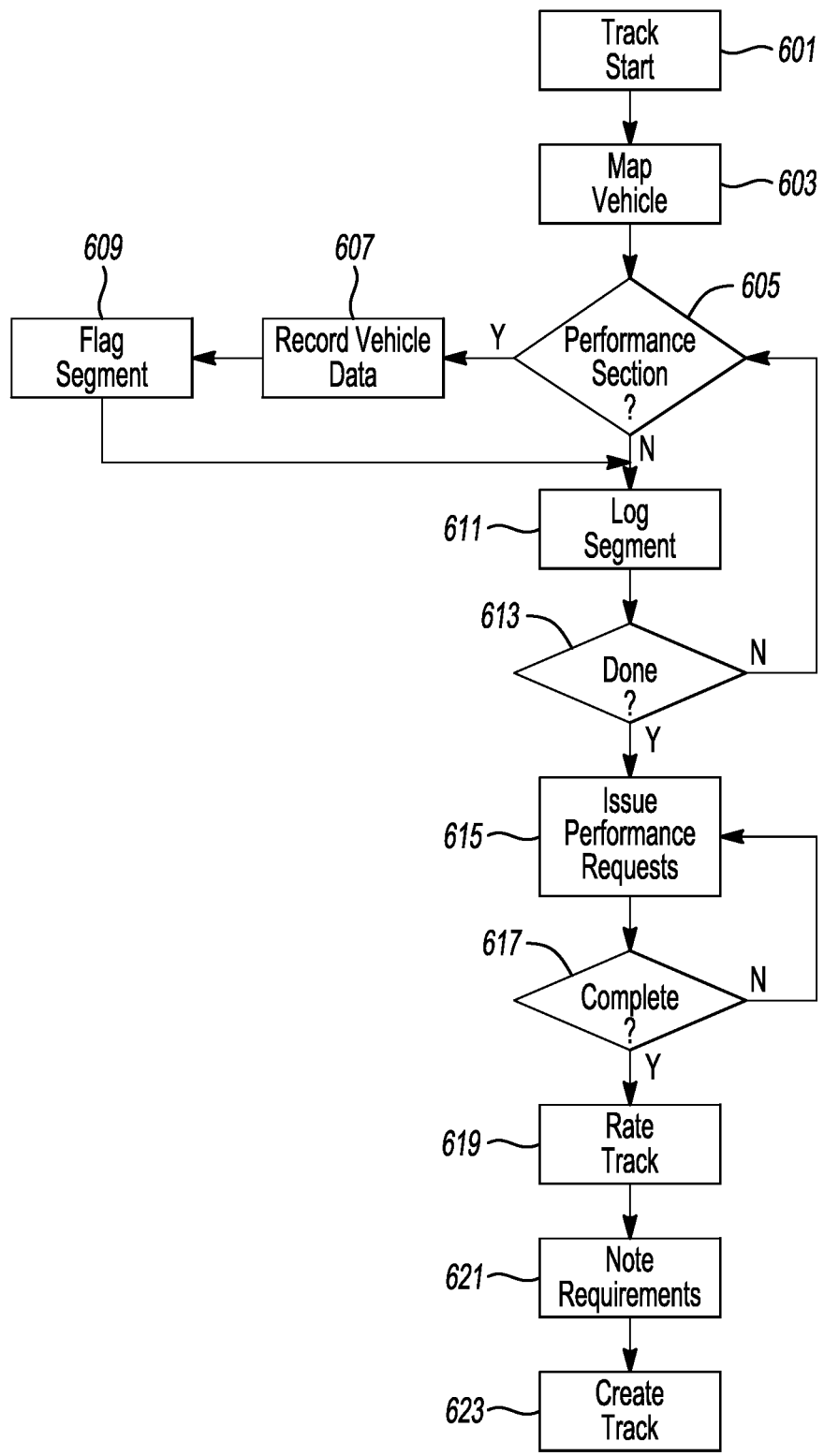
FIG. 6 shows an illustrative process for course creation and modification.

FIG. 6 shows an illustrative process for course creation and modification. In this example, track personnel or a driver or group of drivers can map out a track that is digitally marked and saved. Aspects of this example can be applied in a variety of track creation concepts, and the entire process need not occur, but is merely illustrative of what is contemplated.

The driver will define a track start at 601, or the track start can be defined by passing a certain location in a certain direction. The start can be a bounded set of coordinates or a location, and can even be confirmed by proximity to, for example, a beacon or DSRC transceiver or set of beacons or transceivers. RSSI can be used in this instance to determine proximity to transceivers or beacons.

As the vehicle 101 progresses through a journey, the process can map vehicle locations at 603. This can include tracking coordinates every X seconds and/or other reasonable methods of tracking where a vehicle is located. Vehicle heading may also be contemplated to give the track a bit of directionality, multiple vehicles veering left at a point may indicate an obstacle, and the track may be veered accordingly. Vehicle detection systems (cameras, RADAR, LIDAR, etc.) may also be used to track obstacles and impediments, and vehicle control systems may detect grades, pitch, yaw, roll, bumpiness, etc. Any reasonable characteristics may be added to a track data repository, and visual representations of any reasonable object or track condition may be displayed (e.g., displaying a fixed obstruction or displaying a portion of track as bumpy).

If the vehicle 101 reaches a performance section of track (e.g., very bumpy, steep bank, sharp curve, etc.) at 605, the process may record additional vehicle data relating to any engaged or altered vehicle systems or additional sensor and feedback data at 607. This data may be useful in defining what systems should be engaged if the track is used, or what systems should be engaged when a section is approached. The process also flags the section at 609, which will be discussed later in more detail.

Until the track is done at 613, which can be determined by reaching the start point or by driver indication, for example, the process continues to log locations and segments of track at 611, noting performance sections and flagging them as needed.

In this example, once the track is complete, the process may issue some performance requests at 615. This includes requests to re-travel certain performance sections of a track for additional data-gathering and/or alternative system usage, allowing the creator to define some preferred system settings through activation. Also, certain drivers mapping a track may not be sure of which systems to use, or how to configure them, and so the vehicle 101 can re-drive portions of the track with different settings until performance statistics and the driver indicates that preferred performance was achieved. While not necessary, this can help guide that driver and/or future drivers through performance section system settings on future journeys. This reiteration process may also be useful to widen boundaries of a track or define sections of a track.

For example, a first driver may drive a general route that has certain tolerances (e.g., 5 feet) on either side of the vehicle marked. A second driver may drive the interior of the track, and be only given 1 foot of tolerance on the outside of the vehicle (facing the interior of the track space) so that an inner boundary can be better defined. That driver may drive closer to interior obstacles and along the interior edge of performance sections in case a portion of the section performs differently. A third pass may be along the exterior of the track, defining a similar boundary with a decreased tolerance towards the outside of the track space). Then vehicles may drive at 2-3 foot widths along any performance sections (e.g., if the section is 20 feet wide, it may take 5-7 passes to cover it all) to better understand terrain changes within the performance section. This same process may also be used to cover the width of the whole track and gather increased data.

Unlike a road track, where the road likely has similar characteristics across the width of the track, and where boundaries are often defined by curbs and marked lines, an off-road track may change significantly across a width, and so the process is capable of mapping the track repeatedly and differently at different locations to give future drivers a better sense of what may be encountered. The track map itself may show different portions of a performance section differently (e.g., without limitation, red/yellow/green) indicating a skill or equipment level recommended or required to traverse a given portion at a given location.

Future driver data that is gathered and detected by other vehicles can also continually be used to update track data, so the more a track is traveled the better the snapshot of what is occurring at a given location may be. Onsite data may even indicate how many passes were made of the track prior to presentation in the current track map, to inform a driver how well the track is likely mapped out. Once the iterative process is completed, if utilized, at 617, then the process may rate the track at 619. This can include an estimated experience level, vehicle recommendations or requirements, or any other reasonable set of ratings that may indicate requirements or recommendations for travel on the track.

If park personnel who are highly skilled continually remap tracks every few months, they may not appreciate the difficulty of a given track, and so may map out an "easy" track that is actually difficult or high-performance. The rating system, while not necessary, can serve as a backstop, and may encourage them to map an even easier track next, instead of a more difficult track because they incorrectly perceived a difficult track as easy.

Based on utilized systems, vehicles used to create the track, driver or personnel indications or local rules governing track usage, for example, the process may also attach one or more requirements to the created track at 621. This can include, for example, vehicle requirements, system engagement requirements, driver experience requirements, setting requirements, communication requirements, etc. Anything that is a requirement could also be a recommendation, if it is not an explicit requirement. The process then creates the track at 623 and uploads it to any relevant databases that may benefit from track access (e.g., onsite database, local region database, cloud database, etc.).

The illustrative embodiments and the like allow for improved system usage on varied terrain resulting in a possible diminished likelihood of incident and address issues associated with current driving in varied and unfamiliar terrain, as well as dynamically created track travel. These solutions, and the like, improve the ability of vehicles to communicate with each other, improve the ability of vehicles to match system usage to identified and dynamic conditions, and allow for improved automatic monitoring and restriction of improper vehicle usage.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   at least one server processor enabled to:
   receive confirmation that a vehicle has accepted automatic control imposition for a drive within a geo-fenced boundary;
   track travel of a plurality of vehicles, including the vehicle, within the geo-fenced boundary;
   determine that the vehicle has a threshold likelihood of encountering at least one of another vehicle, an interior boundary within the geo-fence, or the geo-fenced boundary at a threshold speed or above, wherein
   the determination that the vehicle has the threshold likelihood of encountering the another vehicle is based at least in part on headings and speeds of both the vehicle and the another vehicle, wherein
   responsive to the determination indicating that the vehicle has the threshold likelihood of encountering the another vehicle, the at least one server processor is further enabled to choose at least one of the vehicle or the another vehicle for automatic control imposition and wherein
   the imposition of automatic control imposes at least one of speed limiting or controlled braking to prevent the chosen vehicle from reaching a crossing point along the non-chosen vehicle's path at the same time the non-chosen vehicle reaches that point; and wherein
   responsive to the determination indicating the threshold likelihood of encountering at least the interior boundary or the geo-fenced boundary, impose the automatic control on the vehicle, including at least one of the controlled braking or the speed limiting.

2. The system of claim 1, wherein the confirmation includes verifying that the vehicle has a digital permit to drive within the geo-fenced boundary, data indicating the digital permit having been received by the at least one server processor.

3. The system of claim 1, wherein the at least one server processor is enabled to wirelessly communicate with the vehicle and send a request for automatic control and wherein the confirmation is responsive to the request.

4. The system of claim 1, wherein the determination that the vehicle has the threshold likelihood of encountering at least one of the interior boundary within the geo-fence or the geo-fenced boundary is based at least in part on a heading and speed of the vehicle.

5. The system of claim 4, wherein the interior boundary leads to a dangerous or protected location and wherein the determination results in controlled braking designed to stop the vehicle prior to reaching the interior boundary.

6. A method, performed by at least one server processor, comprising:
   receiving confirmation that a vehicle has accepted automatic control imposition for a drive within a geo-fenced boundary;
   tracking travel of a plurality of vehicles, including the vehicle, within the geo-fenced boundary;
   determining that the vehicle has a threshold likelihood of encountering at least one of another vehicle at a threshold speed or above, based at least in part on headings and speeds of both the vehicle and the another vehicle; and
   responsive to the determination, choosing at least one of the vehicle or the another vehicle for automatic control imposition and wherein
   the imposition of automatic control imposes at least one of speed limiting or controlled braking on the chosen vehicle to prevent the chosen vehicle from reaching a crossing point along the non-chosen vehicle's path at the same time the non-chosen vehicle reaches that point.

7. The method of claim 6, wherein the confirmation includes verifying that the vehicle has a digital permit to drive within the geo-fenced boundary, data indicating the digital permit having been received by the at least one server processor.

8. The method of claim 6, further comprising wirelessly communicating between the server processor and the vehicle and sending a request for automatic control, and wherein the confirmation is responsive to the request.

* * * * *